Fig. 2.

M. J. MacLENNAN.
MIXING MACHINE.
APPLICATION FILED MAY 26, 1913.

1,140,385.

Patented May 25, 1915.
3 SHEETS—SHEET 3.

WITNESSES
M. Ray Taylor
Walter P. Geyer.

INVENTOR
Malcolm J. MacLennan
BY Geyer & Popp
ATTORNEYS

UNITED STATES PATENT OFFICE.

MALCOLM J. MacLENNAN, OF BUFFALO, NEW YORK, ASSIGNOR TO ARTHUR V. BOGGS, OF TORONTO, ONTARIO, CANADA.

MIXING-MACHINE.

1,140,385.  Specification of Letters Patent.  Patented May 25, 1915.

Application filed May 26, 1913. Serial No. 769,830.

*To all whom it may concern:*

Be it known that I, MALCOLM J. MACLEN-NAN, a citizen of Canada, residing at Buffalo, in the county of Erie and State of New York, have invented new and useful Improvements in Mixing-Machines, of which the following is a specification.

This invention relates to a machine designed more particularly for mixing different kinds of cereals, grains or other granular material with a suitable sweetening medium such as molasses for producing an animal food although the machine may be also used for mixing other materials.

It is the object of this invention to produce a machine of this character which is capable of mixing various ingredients in measured quantities thoroughly, expeditiously and economically.

In the accompanying drawings.

Similar characters of reference indicate corresponding parts throughout the several views.

1, 2, 3, 4 and 5 represent a plurality of discharge or delivery spouts which have their lower ends arranged side by side in a transverse row while the upper ends of the same are connected with supply bins or hoppers adapted to hold different kinds of grains, cereals or other material either in a ground, pulverized or other form which will permit the same to flow freely from each bin downwardly through the companion discharge spout. The lower ends of these spouts are flush with each other and are adapted to be opened and closed by means which preferably comprise a single trap door 6 normally extending horizontally across the lower ends of the several spouts so as to close the same. The door is preferably pivotally connected at its front edge with the lower front edges of the group of supply spouts by means of hinges 7 and the same is normally held in its elevated horizontal or closed position by means of a weight 8 mounted on an arm 9 projecting rearwardly from the rear edge of the door. The latter is also normally locked in its closed position by a locking device, latch or catch which preferably comprises an upright spring arm 10 secured at its upper end to the rear wall of the several discharge spouts and provided at its lower end with a bill, nose or shoulder 11 adapted to engage with the underside of the trap door at the rear edge thereof. Upon pressing the lower end of this catch rearwardly the door is released and will be depressed by the material within the spouts resting upon the same and thereby permit this material to discharge from these spouts, but after the material has cleared the door and the latter is relieved of the pressure of the same the weight 8 again raises the door into its closed position. During the closing movement of the door its rear edge engages with the beveled or rounded nose 11 of the locking latch and deflects the same and after the door passes above this nose the latch again springs forwardly into engagement with the underside of the door and holds the same securely in its closed position.

12, 13, 14, 15, 16 represent a plurality of cut-off gates, slides or valves each of which has the form of a plate and is adapted to move forwardly and backwardly across the lower part of one of the discharge spouts above the lower end thereof for the purpose of producing a measuring chamber between this slide or cut-off valve and the door and permitting the quantity of material in this chamber to be discharged from this spout upon opening the door while the material in the spout above the slide is held back and prevented from escaping. Means are provided for alternately opening and closing the discharge door and cut-off slide of each spout at predetermined intervals so that measured quantities of material are discharged from each supply hopper through its companion spout which are to be subsequently mixed with the measured quantities of the materials contained in the other supply hoppers for producing a mixture containing certain proportions of the several cereals, grains or other materials which are being mixed. In order to permit of varying the capacity of the space between each of the cut off slides and the trap door and thereby vary the amount of measured material which is supplied at one time to the mixture which is to be produced this slide may be pushed forwardly and backwardly through one or the other of a vertical row of horizontal transverse slots 17 formed in the rear wall of the lower part of its companion discharge spout. When the slide is engaged with the lower slot the quantity of material which is discharged at one time from the spout is less while upon engaging this slide with one of the upper slots this quantity is increased accordingly.

Figure 2:
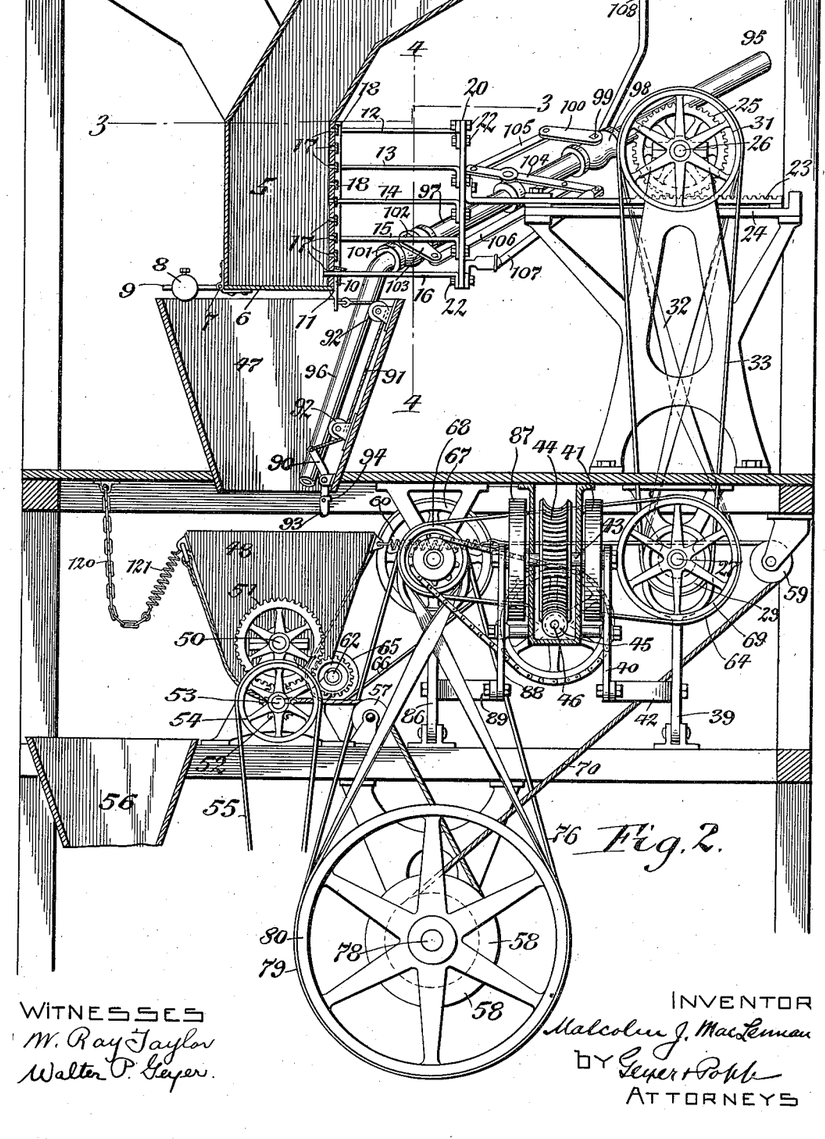
Fig. 2 is a vertical longitudinal section of the same.
Figures 3, 4:
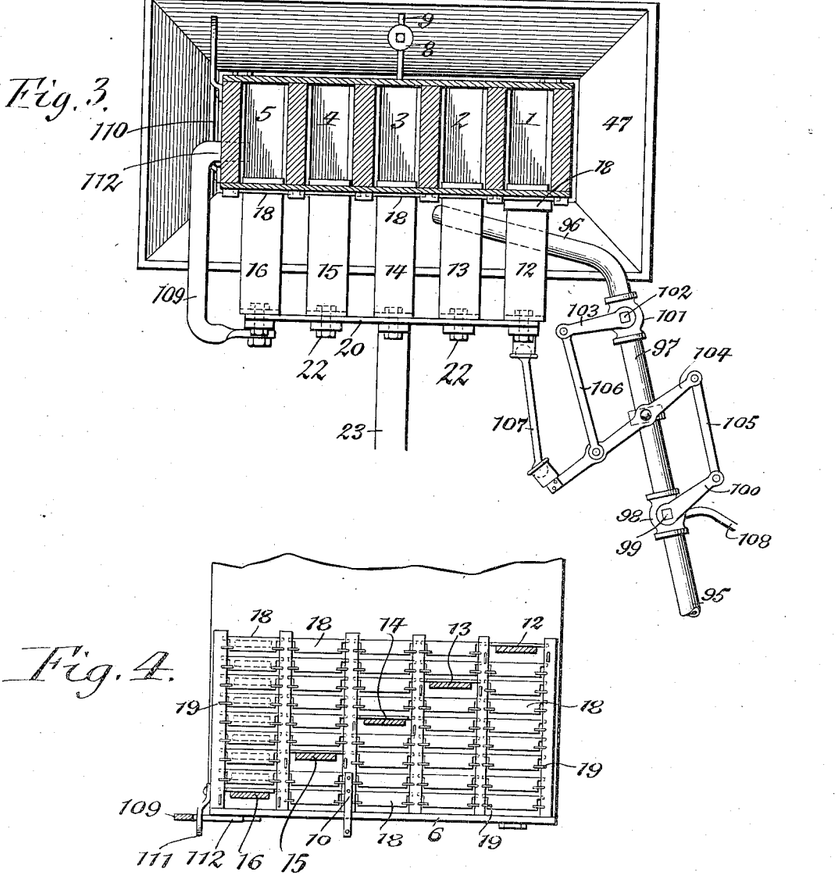
Fig. 3 is a fragmentary horizontal section thereof taken in line 3—3, Fig. 2.
Fig. 4 is a fragmentary vertical transverse section taken in line 4—4, Fig. 2.

In order to prevent the loose material in the spout from flowing out through those guide slots 17 which are not occupied by the valve slide, a lid or shutter 18 is provided for each of these slots whereby the latter may be uncovered for receiving the slide or closed for preventing the escape of loose material from the spout. In its preferred form each of these lids is arranged to extend over its respective slot on the outer side of the spout and the same is pivoted at its upper edge on the spout so that it can be swung up to clear the companion slot and permit the insertion therein of the slide, as indicated with reference to the lowermost slot in the spout shown in Fig. 2, or the lid may be swung down across the outer end of this slot for closing the same, as shown with reference to the upper slots of the spout in Fig. 2. When in its lowered or closed position each lid may be locked in place by any suitable means, for instance as shown in Figs. 3 and 4, by means of two turn buttons 19 arranged on the adjacent part of the rear wall of the spout and adapted to be engaged with the outer side of the lid.

It will be obvious from the foregoing that by engaging each of the cut-off slides with one or the other of its guide slots in the companion supply spout that the amount of material discharged therefrom during each feeding operation may be regulated and that different proportions of the different materials discharged from the several spouts at each operation may be obtained in accordance with the character of the mixture which is desired and the purpose to which the same is intended.

Various means may be employed for moving the several slides forwardly and backwardly but those shown in the drawings, as an example, have been found suitable in practice and are constructed as follows: 20 represents a horizontally and longitudinally reciprocating valve operating head arranged in rear of the outlet portions of the spouts. The rear ends of the several cut-off slides are connected with this head so that they are moved simultaneously and this connection is effected by means which permit each cut-off slide to be adjusted vertically in its companion spout in accordance with the amount of material which is to be discharged during each operation. The preferred means for thus effecting this adjustment comprises a plurality of upright slots 21 formed on the valve head and each of which is adapted to receive a clamping bolt 22 arranged on the rear end of one of the slides. By loosening this bolt the respective slide may be adjusted vertically on the valve head to suit the particular guide slot of the spout with which the same is associated. On its rear side the valve head is provided with a longitudinal horizontal gear rack 23 which is mounted to slide in a guideway 24 formed on the adjacent part of the main frame and this gear rack meshes with a gear wheel 25 mounted on a driven shaft 26 which is journaled in bearings on the adjacent part of the frame. This shaft is turned alternately in opposite directions for causing the cut-off valves or slides to be reciprocated, the means for this purpose shown in the drawings comprising a driving shaft 27 journaled in suitable bearings below the gear rack and wheel and turning continuously in the same direction.

28, 29 represent two driving pulleys mounted loosely on the driving shaft and 30, 31 two driven pulleys mounted on opposite ends of the driven shaft 26.

32 represents a crossed belt passing around the pair of companion pulleys 28, 30 on the driving and driven shafts, and 33 a straight belt passing around the pair of companion pulleys 29, 31 on said driving and driven shafts, respectively. By connecting either one or the other of these driving pulleys with the driving shaft, the driven shaft will be caused to turn either in one direction or the other. The connection and disconnection of each of these driving pulleys with the driving shaft may be effected by any suitable means, those shown in the drawings being preferred and comprising a coupling or clutch sleeve 34 splined on the driving shaft between the driving pulleys 28, 29 so as to be compelled to turn with this shaft but capable of sliding lengthwise thereon and coupling or clutch jaws or teeth 35, 36 formed on opposite ends of the coupling sleeve and adapted to engage respectively with clutch teeth or coupling jaws 37, 38 on the adjacent ends of the corresponding driving pulleys 28, 29. While the coupling sleeve is in its central position its coupling jaws are out of engagement from the coupling jaws of both driving pulleys at which time the cut-off slides are at rest but upon shifting the coupling sleeve lengthwise so that the jaws at one or the other of its ends engage with the clutch jaws of one or the other of the driving pulleys the cut-off slides will be either moved forwardly or backwardly. The longitudinal movement of the coupling sleeve is effected by means which comprise a clutch shifting lever 39 pivoted at its lower end on an adjacent stationary part while its upper forked end is connected with the coupling sleeve so that the latter is compelled to slide on the driving shaft upon rocking the clutch lever but the coupling sleeve is free to turn with the driving shaft independently of the clutch shifting lever.

The rocking movement of the clutch lever is produced by means which comprise a cam lever 40 pivoted on a convenient stationary part and having one of its arms engaging with a rotatable cam 41 while its other arm is connected by a link 42 with the clutch lever 39. The cam 41 is mounted on one end of a shaft 43 which is provided with a worm wheel 44 engaged by a worm 45 mounted on a shaft 46 turning constantly in the same direction. The cam 41 is so constructed that it shifts the clutch lever 39 in a manner to cause the same to engage the coupling sleeve with one of the driving pulleys and cause the several cut-off slides to make a complete stroke in one direction, then shift the coupling sleeve out of engagement from the driving pulley which has just been operated and hold the same in its central neutral position a predetermined length of time, then engage the coupling sleeve with the other driving pulley for causing the several cut-off slides to be moved a complete stroke in the opposite direction, and then move the coupling sleeve again into its central or neutral position to permit the cut-off slides to remain at rest for a predetermined length of time at the end of the last mentioned stroke.

47 represents a stationary funnel arranged below the outlets of the several delivery spouts and adapted to receive the material discharged from the latter.

Below the funnels is arranged a mixing box, tub, trough or chamber 48 which has its bottom and sides closed and has an open top which is normally arranged vertically in line with the outlet at the lower end of the funnel for receiving the material from the latter. This mixing box contains a rotatable beater 49 whereby the materials discharged into the box are thoroughly mixed with each other. This beater may be of any suitable and well known construction and is preferably mounted upon a horizontal shaft 50 extending through the lower part of the mixing trough. Rotary motion is imparted to the beater shaft 50 by a gear wheel 51 secured to one end thereof and meshing with a pinion 52 on a counter shaft 53 and the last mentioned shaft may be turned by means of a pulley 54 secured thereto and a driving belt 55 passing around this pulley and receiving motion from a prime mover of any suitable character such as a gas engine or steam operated motor.

Figure 1:
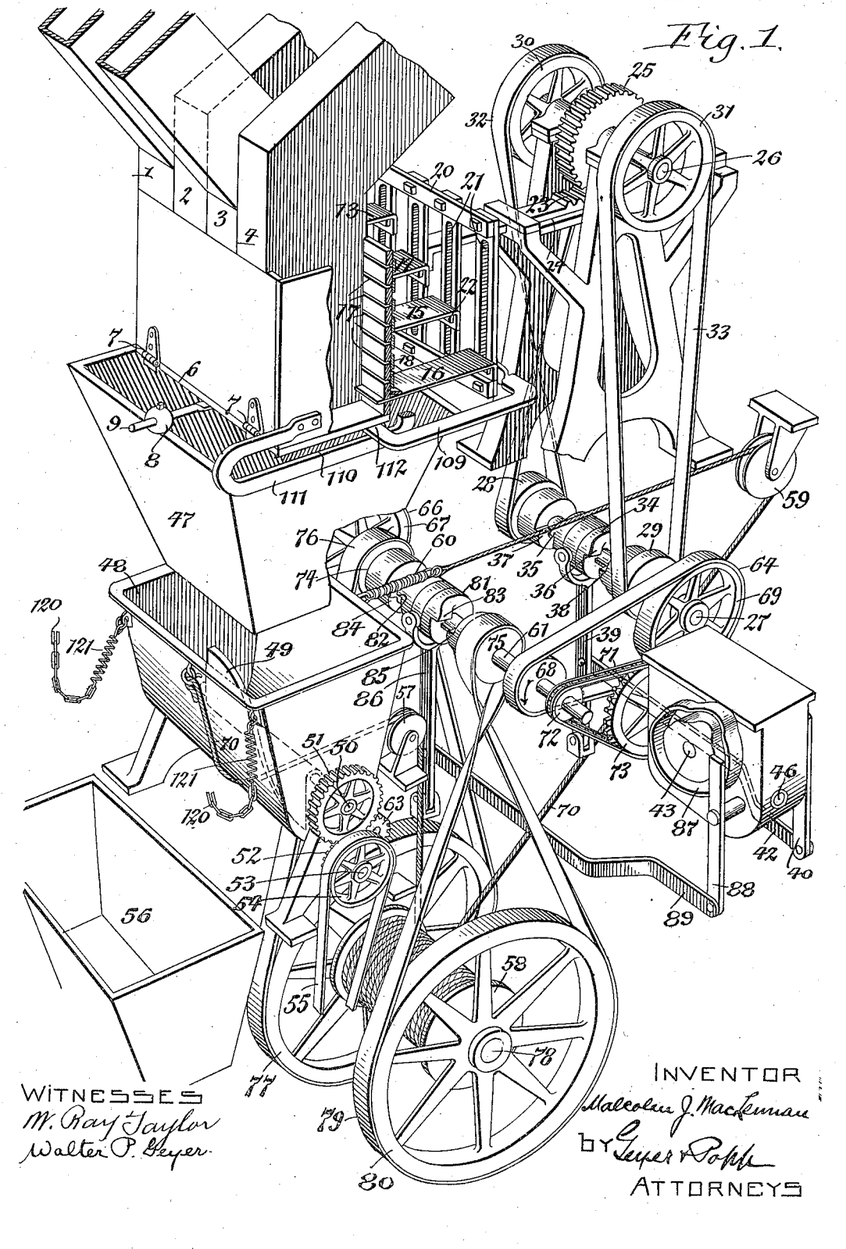
Figure 1 is a perspective view of a mixing machine embodying my invention.

When the batch of material in the mixing box has been sufficiently commingled so that the different ingredients are evenly and uniformly distributed throughout the entire mass this box is tipped to one side so that the contents thereof are discharged therefrom. For this purpose this mixing box is rotatably mounted by journaling the same on the beater shaft so that the mixing box may be either turned upwardly and rearwardly into its operative upright position below the funnel, as shown in Figs. 1 and 2, or this box may be tipped forwardly and downwardly so that its contents are discharged into a delivery chute 56 which is arranged in front of the mixing box and whereby the mixed material is carried to any suitable place for packing the same in bags, barrels or boxes or disposing of the same otherwise.

Means are provided for periodically and automatically tipping the mixing box, then righting the same and then holding the same in an upright position preparatory to receiving a new batch of material from the funnel and mixing the same. The means for this purpose which are shown in the drawings are constructed as follows: 70 represents a tipping line or cable which is secured at its front end to the front side of the mixing box at the upper edge thereof and passing from thence downwardly and rearwardly around the rounded underside of this box, thence rearwardly and downwardly around an intermediate guide roller 57, thence one or more times around a drum 58, thence rearwardly and upwardly around an intermediate guide roller 59 and thence forwardly and connected at its rear end yieldingly to the rear side of the mixing box by means of an interposed spring 60 forming practically a part of this tipping line or cable. Upon turning the drum in one direction a pull is produced on that end of the line or cable which is attached to the front side thereof causing the same to be tipped forwardly into a discharging position while the other end of the cable is paid out from the drum to permit the last mentioned end to follow the forward tipping movement of the mixing box, while upon turning the drum in the opposite direction a pull is produced on the rear end of the tipping cable so as to turn the box into an upright position while the opposite or front end of the tipping cable is paid out in order to enable the same to follow the upward movement of the mixing box. By employing a spring section in the tipping cable or line, compensation is provided for any variation in the length of this line.

61 represents a driving shaft which is rotated continuously in the same direction by any suitable means, for instance by means of a counter shaft 62 provided at one end with a gear pinion 63 which meshes with the gear wheel 51 while its opposite end is provided with a pulley 65 which receives a belt 66 passing around a pulley 67 at one end of the driving shaft 61. Motion is transmitted from the driving shaft 61 to the driving shaft 27 by means of a belt 64 passing around pulleys 68, 69 on these shafts. Motion is also transmitted from the driving shaft 61 to the worm shaft 46 by means of a sprocket chain 71 passing around sprocket wheels 72, 73 secured respectively to these shafts.

74, 75 represent two driving pulleys secured to the driving shaft 61 the first of which receives a straight belt 76 passing around a pulley 77 at one end of the drum shaft 78 while the second receives a twist belt 79 passing around a pulley 80 on the other end of the drum shaft.

81 represents a clutch or coupling sleeve splined on the driving shaft 61 between the pulleys 74, 75 so as to turn with this shaft but be capable of sliding lengthwise thereon. At its opposite ends the clutch sleeve 81 is provided with clutch jaws or coupling teeth 82, 83 which are adapted to engage respectively with clutch teeth or coupling jaws 84, 85 on the opposing ends of the driving pulleys 74, 75. When the clutch sleeve 81 is in its central position it is out of engagement with both of the pulleys 74, 75 but when this clutch sleeve is shifted lengthwise to one end of its stroke the clutch jaws at one end thereof engage with one of the driving pulleys 74, 75 and cause the drum to be turned in the direction for tipping the mixing box while upon shifting the coupling sleeve so that it is connected with the other driving pulley the drum will be turned in the direction for moving the mixing box into an upright position. This longitudinal movement of the clutch sleeve is effected by means of a clutch lever 86 connected with the sleeve so as not to interfere with the turning movement of the sleeve but compel the same to move lengthwise on the driving shaft upon rocking this lever, a cam 87 secured to the cam shaft 43, and an intermediate cam lever 88 having one of its arms engaging the cam 87 while its other arm is connected by means of a link 89 with the clutch lever 86, as shown in Figs. 1 and 2. The cam 87 is so constructed that it holds the clutch sleeve 81 in its neutral or inoperative position and out of engagement from both driving pulleys 74, 75 a sufficient length of time to hold the mixing box in an upright position while the material to be mixed is discharged into the same by the funnel and the material is being mixed then the clutch sleeve is coupled with one of the respective driving pulleys for tipping the mixing box into a dumping position and then the clutch sleeve is engaged with the other driving pulley for again returning the mixing box into an upright position and then the clutch sleeve is retained in its neutral position for again holding the mixing box at rest while receiving another batch of material and mixing the same.

In order to prevent the mixing box when tipped for discharging the same from striking a blow or unduly straining the tipping mechanism means are provided for cushioning the descent of the box which preferably comprise two chains, cables or lines 120 connected at their upper ends with a stationary part while their lower ends are connected by springs 121 with the upper front part of the box. As the latter is tipped forwardly the springs 121 come into play and restrain the descent of the box so that the machine will not be jarred or worn unduly and during the upward movement of the box the line 120 and springs 121 are doubled and slackened, as shown in Fig. 2.

Means are provided for automatically opening the trap door 6 of the delivery spouts during the last portion of the return or rearward movement of the mixing box for discharging the measured quantities of material from the several spouts into the mixing box preparatory to mixing the same. The preferred means for accomplishing this purpose which are shown in the drawings comprise a trip lever 90 pivoted on the lower part of the rear wall of the funnel, a pulling cord or line 91 connected at its lower end with the upper arm of the trip lever and at its upper end with the latch 10 of the trap door while its intermediate part passes around guide rollers 92 mounted on the funnel, and a trip finger 93 pivoted on the lower arm of the trip lever so as to be capable of swinging forwardly thereon but limited as to its rearward movement relatively thereto by means of a stop 94 arranged on the finger and engaging with the rear side of the trip lever. During the forward dumping movement of the mixing box the upper edge of its rear wall engages with the trip finger and deflects the same forwardly without disturbing the trip lever so that the latch 10 continues to hold the trap door 6 in its closed position. During the last part of the return or backward movement of the mixing box the upper edge of its rear wall upon engaging the trip finger 93, which is now rigid relative to the trip lever, causes this lever to be turned in a direction which will produce a downward pull on the line 91 and thereby disengage the latch 10 from the trap door 6. At this time the several cut-off slides or valves 12–16 are moved inwardly or forwardly and bridge the spaces within these spouts at different distances from the trap door, so that only the material in these spouts below the cut-off valve discharges downwardly therefrom into the funnel the instant the trap door is released and is directed by this funnel into the mixing box. The depression of the trap door for releasing the material from the discharge spouts is effected solely by the weight of the material resting upon this door but after this material has escaped from the spouts the trap door is automatically raised into its closed position by the weight 8 and the door is also locked in its closed position by snapping past the latch 10 and becoming interlocked with the shoulder 11 of the latter.

At times it is desirable to add a liquid to the compound or mixture such as molasses for the purpose of sweetening the same, this being particularly desirable in a case of animal foods. For the purpose of introducing such a liquid periodically in measured quantities into the mixing box with each batch of the granular materials of the mixture, automatic means are provided which are preferably constructed as follows: Extending from a suitable source of supply into the funnel is a pipe or conduit comprising a supply section 95 connected with the supply reservoir, a delivery section 96 projecting downwardly into the funnel and a measuring section 97 interposed between the supply and delivery sections. Between the supply and measuring sections is arranged an inlet valve 98 whereby communication between these sections may be established or cut off. This valve may be of any suitable construction that shown in the drawings is provided with a rotatable plug 99 having a rock arm 100 on the exterior of the casing. An outlet valve 101 is interposed between the measuring section and the delivery section for the purpose of connecting or disconnecting these sections. The last mentioned valve also is provided with a rotatable plug 102 having a rock arm 103 on the exterior of the valve casing but projecting in a direction opposite to the arm of the inlet valve. A connection between the liquid inlet and liquid outlet valves 98, 101 is provided which is so constructed that upon opening one of these valves the other will be closed, and vice versa, thereby providing for a measured and step by step flow of the liquid from the supply reservoir into the mixing box and preventing a continuous flow of this material. The preferred means for this purpose shown in the drawings comprise an intermediate rock lever 104 pivoted on the measuring section of the liquid pipe or other convenient support and having one of its arms connected by a link 105 with the arm of the inlet valve and its other arm connected by a link 106 with the arm of the outlet valve. This intermediate rock lever is operated automatically at predetermined intervals and preferably in harmony with the operation of the cut-off valves by means of a link 107 connecting the head of the cut-off valves with one arm of the intermediate rock lever, as shown in Fig. 3.

While the cut-off valves are withdrawn from the spouts and the material in the several spouts fall by gravity so as to fill the space below these valves and the trap doors the inlet and outlet valves 98, 101 have been turned by the rearward movement of the valve head so that the inlet valve is closed and the outlet valve is opened, thereby permitting the liquid previously contained in the measuring section of the liquid conduit to flow into the previous batch of materials discharged from the several spouts into the mixing box so that these several ingredients may be thoroughly mixed before being packed. During the forward movement of the cut-off valves the inlet valve is opened and the outlet valve is closed, thereby causing the measuring section of the liquid pipe to be again filled with liquid. As the cut-off valves are again withdrawn the outlet valve is opened and the inlet valve closed to permit the charge of liquid in the measuring section to flow to the mixing box, this operation being repeated for each batch of materials which is being mixed. In order to prevent any air from being trapped in the measuring section of the liquid conduit a vent pipe 108 is preferably connected with the inlet valve and led upwardly to a point above the liquid supply reservoir so that any air contained in this pipe may escape to the atmosphere without, however, permitting the escape of any liquid.

If for any reason the trap door 6 should not be closed immediately after discharging the granular material from the several spouts due to binding of its hinges, the failure of its weight or the presence of some obstruction, means are provided for positively closing this trap door at the same time that the cut-off valves or slides are withdrawn rearwardly from the spouts. The preferred means for this purpose shown in the drawings for this purpose comprise a closing arm 109 guided to move horizontally in a way 110 formed on a bracket 111 secured to the spouts and connected at its rear end with the cut-off valve head and provided at its front end with a lifting nose or finger 112 adapted to engage with the underside of the trap door. As the cut-off valves move forwardly the lifting finger moves rearwardly from underneath the trap door so as to permit the latter to drop and discharge the contents of the spouts below the cut-off valves the instant the latch 10 is released and during the backward movement of the cut-off valve the lifting finger again moves rearwardly underneath the trap door and lifts the latter into its closed position, as shown in Figs. 1 and 3. It follows from this construction that if the trap door is not closed by its weight 8 after being relieved of the pressure of the material discharging from the spouts below the cut off valves the lifting finger 112 during the rearward movement of the cut-off valves will positively lift the trap door into its closed position, thereby preventing the trap door from remaining open while the cut-off valves are withdrawn from the delivery spouts which otherwise would leave the spouts wholly unobstructed and permit the contents of the bins containing the granular material to flow freely out of the spouts and result in flooding the machine and wasting the material.

The operation briefly of this machine is as follows: Assuming that the cut-off valves are withdrawn from the spouts, the trap door is in its closed position across the lower ends of the spouts, the mixing box is in its upright position, the inlet valve 98 is closed and the outlet valve 101 opened, as shown in Figs. 1, 2, and 3, granular material from the several bins will flow downwardly through the several spouts until arrested by the trap door, and the liquid in the measuring section of the liquid conduit will flow into the mixing box for admixture with the granular materials previously delivered into the box. After a batch of granular material and liquid has been delivered into the mixing box the latter is held for a suitable length of time in an upright position and the ingredients therein are agitated by the beater until they are thoroughly and uniformly commingled. Thereafter the mixing box is tipped forwardly so as to discharge the mixed batch of material therefrom and then this box is again returned to its upright position.

After the material from the bins has flowed downwardly in the spouts to the trap door the several cut-off valves are moved forwardly so as to bridge the spouts at suitable distances above the trap door, this forward movement of the cut-off valves being effected at any suitable time after the lower parts of the spouts have been filled but before the mixing box has returned from its dumping position into its receiving position. During the last part of the return movement of the mixing box the trap door is released by the withdrawal of the latch 10 through the medium of the mechanism which is operated upon by the mixing box, thereby permitting the weight of the material resting upon the trap door to depress the latter and permit this material to flow by gravity out of the spouts and through the funnel into the mixing box. Immediately thereafter the trap door is closed by its weight and then the cut-off valves are moved rearwardly out of the spouts, and the trap door is also positively closed by the lifting finger 112 if the weight 8 has failed to accomplish its purpose. During the forward movement of the cut-off valves the outlet valve 101 is closed and the inlet valve 98 is opened so as to permit of filling the measuring section of the liquid conduit with molasses or other liquid which is being supplied but during the backward movement of the cut-off valves which occurs immediately after the granular material has been discharged into the mixing box, the outlet valve 101 is opened and the inlet valve 98 is closed, thereby permitting the measured quantity of molasses in the measuring section of the liquid pipe to flow into the mixing box there to become mixed with the granular material previously discharged into the same.

It will be noted from the foregoing description that the operation of this machine is entirely automatic after the same has been once adjusted as to the proportions of the materials which enter into the mixture of the animal food or other compound which is to be produced and that all that is necessary is to keep the supply bins filled with granular material and the reservoir filled with the desired kind of liquid and to take care of the mixed material as the same is discharged from the mixing box. This machine is very efficient in operation and requires the expenditure of but little power and insures the production of a mixture of animal food or the like in which the ingredients are thoroughly and uniformly distributed throughout the entire mass, thereby rendering the same particularly suitable for mixing materials in which this condition is a desirable feature.

I claim as my invention:

1. A mixing machine comprising a spout, a door for closing the lower end of the spout, and a valve adapted to be moved across said spout at different places above said door.

2. A mixing machine comprising a spout provided with a vertical row of slots in its side, a door for closing the lower end of said spout, and a valve adapted to be moved through one or the other of said slots and across said spout.

3. A mixing machine comprising a spout provided with a vertical row of slots in its side, a door for closing the lower end of said spout, a valve adapted to be moved through one or the other of said slots and across said spout, and means for closing those slots which are not occupied by said valve.

4. A mixing machine comprising a spout provided with a vertical row of slots in its side, a door for closing the lower end of said spout, a valve adapted to be moved through one or the other of said slots and across said spout, and means for closing those slots which are not occupied by said valve comprising lids pivoted on said spout and a turn button for holding each lid across its companion slot.

5. A mixing machine comprising a spout, a door for closing the lower end of the spout, a valve adapted to be moved across said spout at different places above said door, a reciprocating head, and means for adjustably securing said valve to said head.

6. A mixing machine comprising a spout, a door for closing the lower end of the spout, a valve adapted to be moved across said spout at different places above said door, a reciprocating head, and means for adjustably securing said valve to said head, comprising a clamping bolt connected with said valve and passing through a vertical slot in said head.

7. A mixing machine comprising a spout, a door for closing the lower end of the spout, a valve adapted to be moved across said spout at different places above said door, and means for shifting said valve comprising a gear rack connected with said valve and an oscillating gear wheel meshing with said rack.

8. A mixing machine comprising a spout, a door for closing the lower end of the spout, a valve adapted to be moved across said spout at different places above said door and means for shifting said valve comprising a gear rack connected with said valve, a gear wheel meshing with said rack, and means for oscillating said gear wheel comprising two driven pulleys operatively connected with said gear wheel, two driving pulleys, a straight belt passing around one pair of said driving and driven pulleys and a crossed belt passed around the other pair of said driving and driven pulleys.

9. A mixing machine comprising a spout, a door for closing the lower end of the spout, a valve adapted to be moved across said spout at different places above said door and means for shifting said valve comprising a gear rack connected with said valve, a gear wheel meshing with said rack, and means for oscillating said gear wheel comprising two driven pulleys operatively connected with said gear wheel, two driving pulleys, a straight belt passing around one pair of said driving and driven pulleys, a crossed belt passed around the other pair of said driving and driven pulleys, a driving shaft upon which said driving pulleys are mounted loosely, and a coupling sleeve splined on said shaft and adapted to couple either one or the other of said driving pulleys with said driving shaft.

10. A mixing machine comprising a spout, a door for closing the lower end of the spout, a valve adapted to be moved across said spout at different places above said door and means for shifting said valve comprising a gear rack connected with said valve, a gear wheel meshing with said rack, and means for oscillating said gear wheel comprising two driven pulleys operatively connected with said gear wheel, two driving pulleys, a straight belt passing around one pair of said driving and driven pulleys, a crossed belt passed around the other pair of said driving and driven pulleys, a driving shaft upon which said driving pulleys are mounted loosely, a coupling sleeve splined on said shaft and adapted to couple either one or the other of said driving pulleys with said driving shaft and means for shifting said coupling sleeve lengthwise of said shaft.

11. A mixing machine comprising a spout, a door for closing the lower end of the spout, a valve adapted to be moved across said spout at different places above said door and means for shifting said valve comprising a gear rack connected with said valve, a gear wheel meshing with said rack, and means for oscillating said gear wheel comprising two driven pulleys operatively connected with said gear wheel, two driving pulleys, a straight belt passing around one pair of said driving and driven pulleys, a crossed belt passed around the other pair of said driving and driven pulleys, a driving shaft upon which said driving pulleys are mounted loosely, a coupling sleeve splined on said shaft and adapted to couple either one or the other of said driving pulleys with said driving shaft and means for shifting said coupling sleeve lengthwise of said shaft comprising a clutch lever operatively connected with said sleeve, a rotatable cam, and a cam lever engaging said cam and connected with said clutch lever.

12. A mixing machine comprising a spout, a door for closing the lower end of the spout, a valve adapted to be moved across said spout at different places above said door and means for shifting said valve comprising a gear rack connected with said valve, a gear wheel meshing with said rack, and means for oscillating said gear wheel comprising two driven pulleys operatively connected with said gear wheel, two driving pulleys, a straight belt passing around one pair of said driving and driven pulleys, a crossed belt passed around the other pair of said driving and driven pulleys, a driving shaft upon which said driving pulleys are mounted loosely, a coupling sleeve splined on said shaft and adapted to couple either one or the other of said driving pulleys with said driving shaft and means for shifting said coupling sleeve lengthwise of said shaft comprising a clutch lever operatively connected with said sleeve, a rotatable cam, a cam lever engaging said cam and connected with said clutch lever, a worm wheel connected with said cam, and a rotatable worm meshing with said worm wheel.

13. A mixing machine comprising a plurality of spouts arranged side by side, means for opening and closing the lower ends of said spouts, and valves for shutting off said spouts at different distances from the opening and closing means at the lower ends thereof.

14. A mixing machine comprising a plurality of spouts arranged side by side, means for closing the lower ends of said spouts, valves for shutting off said spouts at different distances from the closures at the lower ends thereof and means for adjusting each of said valves toward and from the closures of the respective spout independent of the valves of the other spouts.

15. A mixing machine comprising a mixing box, means for tipping said box, and means for cushioning the movements of said box while tipping the same.

16. A mixing machine comprising a plurality of spouts adapted to deliver different granular material, a vertically rocking mixing box adapted to receive the material from said spouts and means for rocking said box comprising a drum, a tipping line passing around said drum and connected at its opposite ends with said box on opposite sides of its axis, two driven pulleys connected with said drum, a driving shaft, two driving pulleys mounted loosely on said driving shaft, a straight belt passing around a pair of said driving and driven pulleys, a crossed belt passing around the other pair of said driving and driven pulleys, and means for connecting either one or the other of said driving pulleys with said driving shaft.

17. A mixing machine comprising a plurality of spouts adapted to deliver different granular material, a vertically rocking box adapted to receive the material from said spouts and means for rocking said box comprising a drum, a tipping line passing around said drum and connected at its opposite ends with said box on opposite sides of its axis, two driven pulleys connected with said drum, a driving shaft, two driving pulleys mounted loosely on said driving shaft, a straight belt passing around a pair of said driving and driven pulleys, a crossed belt passing around the other pair of said driving and driven pulleys, and means for connecting either one or the other of said driving pulleys with said driving shaft comprising a coupling sleeve splined on said driving shaft and adapted to be connected with either of said driving pulleys, a clutch lever connected with said sleeve, a rotatable cam, and a cam lever engaging said cam and connected with said clutch lever.

18. A mixing machine comprising a rocking mixing box, and means for rocking said box comprising a drum, a line passing around said drum and connected at one end with one side of said box, and a spring connecting the other end of said line with the other side of said box.

19. A mixing machine comprising a spout for delivering granular material, a door hinged at one edge to said spout, a latch for engaging the other edge of the door and holding the same in a closed position, a rocking mixing box adapted to receive the granular material from said spout and movable into a discharging or receiving position, and means for releasing said latch from said door as the box moves into a position for receiving granular material therefrom.

20. A mixing machine comprising a spout for delivering granular material, a door hinged at one edge to said spout, a latch for engaging the other edge of the door and holding the same in a closed position, a rocking mixing box adapted to receive the granular material from said spout and movable into a discharging or receiving position, and means for releasing said latch from said door as the box moves into a position for receiving granular material therefrom comprising a trip lever, a line connecting one arm of said trip lever with said latch, and a trip finger adapted to be engaged by said box and pivotally mounted on the other arm of said lever so as to be free to turn forward but held against turning backwardly relatively thereto.

21. A mixing machine comprising a mixing box, a liquid conduit having a supply section, a delivery section, and a measuring section interposed between said supply and delivery sections, an inlet valve arranged between said supply and measuring sections, an outlet valve arranged between said measuring and delivery sections, and means for causing one of said valves to open and the other to close and vice versa, comprising rock arms connected with the plugs of said valves and an intermediate lever having one of its arms connected with one of said valve arms and its other arm connected with the other valve arm.

22. A mixing machine comprising a spout for delivering granular material, a box receiving the material from said spout, a cut-off valve for controlling the passage of material through said spout, a liquid supply pipe adapted to deliver liquid simultaneously into said box, a valve in said pipe, and means for causing said valves to operate in unison.

23. A mixing machine comprising a spout, a door pivoted to the outlet of said spout, a cut-off valve movable into and out of said spout above said door, and a closing arm moving with said cut-off valve and having a finger adapted during the opening movement of said cut-off valve to engage said door and close the same.

Witness my hand this 22nd day of May, 1913.

MALCOLM J. MacLENNAN.

Witnesses:
ARTHUR V. BOGGS,
THEO. L. POPP.